United States Patent
Hwang

(10) Patent No.: US 8,374,184 B2
(45) Date of Patent: Feb. 12, 2013

(54) METHOD AND MOBILE TERMINAL FOR ACQUIRING PACKET SERVICE

(75) Inventor: Sun Ho Hwang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 732 days.

(21) Appl. No.: 12/220,883

(22) Filed: Jul. 29, 2008

(65) Prior Publication Data

US 2009/0040992 A1    Feb. 12, 2009

(30) Foreign Application Priority Data

Aug. 10, 2007    (KR) .................. 10-2007-0080672

(51) Int. Cl.
H04L 12/56    (2006.01)
(52) U.S. Cl. .................. 370/395.2; 370/329; 370/353
(58) Field of Classification Search .................. None
See application file for complete search history.

(56) References Cited

U.S. PATENT DOCUMENTS

| | | | | |
|---|---|---|---|---|
| 5,564,068 | A * | 10/1996 | Nguyen | 455/433 |
| 6,119,001 | A * | 9/2000 | Delis et al. | 455/433 |
| 6,947,746 | B2 * | 9/2005 | Watanabe | 455/438 |
| 7,136,631 | B1 * | 11/2006 | Jiang et al. | 455/414.1 |
| 7,813,731 | B2 * | 10/2010 | Park | 455/435.1 |
| 2004/0028019 | A1 * | 2/2004 | Mikami | 370/338 |
| 2004/0243661 | A1 | 12/2004 | Ahn et al. | |
| 2005/0083899 | A1 * | 4/2005 | Babbar et al. | 370/342 |
| 2005/0090248 | A1 * | 4/2005 | Shen et al. | 455/432.1 |
| 2005/0180382 | A1 | 8/2005 | Kim et al. | |
| 2005/0207424 | A1 * | 9/2005 | Hallin | 370/395.52 |
| 2007/0298808 | A1 * | 12/2007 | Pan et al. | 455/452.1 |
| 2008/0076389 | A1 * | 3/2008 | Lee et al. | 455/411 |

FOREIGN PATENT DOCUMENTS

| | | |
|---|---|---|
| CN | 1575555 A | 2/2005 |
| WO | WO 03/039039 A1 | 5/2003 |

OTHER PUBLICATIONS

European Search Report dated Sep. 6, 2011 in connection with European Patent Application No. EP 08 16 0440.A, p. 1-6.
Third Office Action dated Sep. 3, 2012 in connection with Chinese Patent Application No. 200810145087.6, 14 pages.

* cited by examiner

Primary Examiner — Donald Mills

(57) ABSTRACT

A method and mobile terminal for acquiring a packet service in a mobile communication system is provided. A mobile terminal of the present invention determines, when it powers on, whether to register with a network on the basis of previously stored packet service usage frequency and updates, when using the packet service after registering with the network, the packet service usage frequency. The mobile terminal of the present invention can reduce waste of resources required for the packet service by reducing communication with the network. A packet service acquisition method of the present invention helps reduces a number of mobile terminals registered with a network, whereby the network can reduce its processing load, resulting in improvement of network throughput.

19 Claims, 6 Drawing Sheets

METHOD AND MOBILE TERMINAL FOR ACQUIRING PACKET SERVICE

CROSS-REFERENCE TO RELATED APPLICATION(S) AND CLAIM OF PRIORITY

The present application claims priority to an application entitled "METHOD AND MOBILE TERMINAL FOR ACQUIRING PACKET SERVICE" filed in the Korean Intellectual Property Office on Aug. 10, 2007 and assigned Serial No. 2007-0080672, the contents of which are incorporated herein by reference.

TECHNICAL FIELD OF THE INVENTION

The present invention relates to a mobile communication system and, in particular, to a method and mobile terminal for acquiring a packet service provided by a mobile communication system.

BACKGROUND OF THE INVENTION

Recent mobile terminals are equipped with various functions in addition to basic voice communication function. Particularly, the mobile terminals support packet services including high speed data and multimedia communications as well as conventional circuit services. The mobile terminal should register itself with an available network for acquiring packet services from the network.

Typically, a mobile terminal automatically registers with the network, upon turning on, for packet services and releases the registration when it turns off. Accordingly, the mobile terminal maintains the registration status even when the packet services are not used, resulting in waste of resources. Particularly when a plurality of mobile terminals are registered with the same network, the network experiences excessive processing load, resulting in degradation of service qualities.

SUMMARY OF THE INVENTION

To address the above-discussed deficiencies of the prior art, it is a primary object to provide a method and mobile terminal for acquiring packet services that is capable of reducing processing load of a network and waste of resources.

In accordance with an exemplary embodiment of the present invention, a packet service acquisition method for a mobile terminal includes determining, when the mobile terminal powers on, whether to register with the network on the basis of a preset network registration mode; updating a packet service usage frequency when activating a packet service; and setting one of distinctive network registration modes using the packet service usage frequency.

In accordance with another exemplary embodiment of the present invention, a packet service acquisition method for a mobile terminal includes setting, when the mobile terminal powers on, a network registration mode of the mobile terminal on the basis of a packet service usage frequency; and updating, when a packet service is used after registration with the network, the packet service usage frequency.

In accordance with another exemplary embodiment of the present invention, a mobile terminal acquiring a packet service from a network includes a memory for storing packet service usage frequency; a control unit for determining, when the mobile terminal powers on, whether to register with the network on the basis of the packet service usage frequency; updating a packet service usage frequency whenever the mobile terminal acquires the packet service from the network and setting a network registration mode according to the packet service usage frequency; and a radio frequency unit for registering the mobile terminal with the network under the control of the control unit.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

In the following, the term "network" is a packet-switched network implemented with at least one of $2.5^{th}$ Generation (2.5G) networks such as general packet radio service (GPRS) and enhanced data GSM environment (EDGE) and 3G networks such as wideband code division multiple access (WCDMA). These network technologies are well known, and thus detailed descriptions of their structures and functions are omitted.

The term "packet service usage frequency" denotes a number of accesses to a packet service. The term "frequency calculation period" denotes a period during which the usage frequency is calculated. That is, packet service usage frequency during the frequency calculation period means how often a mobile terminal accesses the packet service during the predetermined frequency calculation period. The frequency calculation period can be defined by an arbitrary start time. Also, the frequency calculation period can be defined by counting down from the current time.

Figure 1:
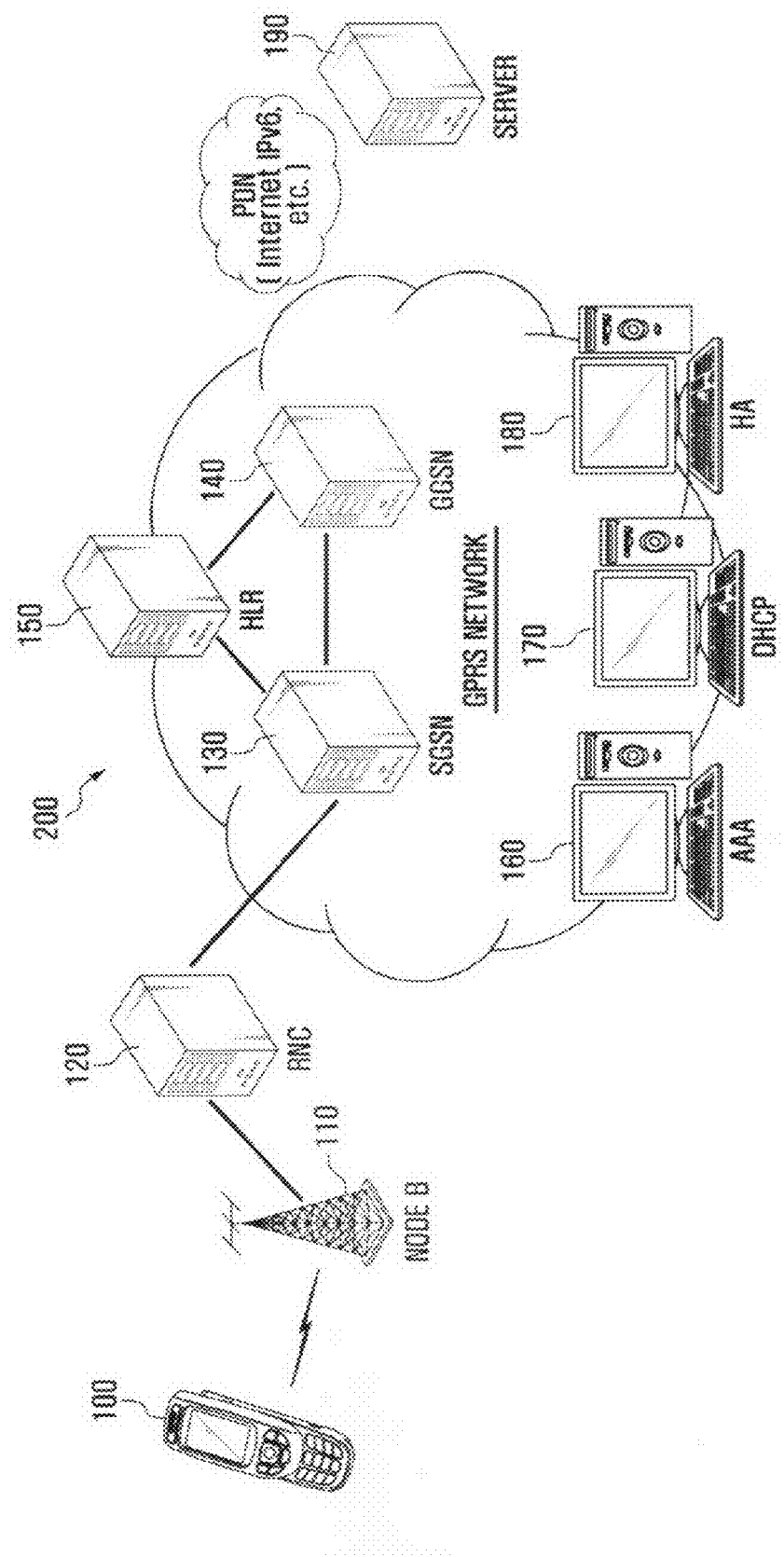
FIG. 1 is a schematic diagram illustrating a communication system to which a packet service acquisition technique is adopted according to an exemplary embodiment of the present invention.

FIG. 1 is a schematic diagram illustrating a communication system to which a packet service acquisition technique is adopted according to an exemplary embodiment of the present invention. In FIG. 1, it is assumed that the communication system is an infrastructure network deployed according a communication standard. In this embodiment it is assumed that the communication system includes a GPRS network.

Referring to FIG. 1, the communication system includes a mobile terminal 100, a server 190, and a network 200. The mobile terminal 100 connects to the server 190 over the network 200. The network 200 includes a radio network subsystem (RNS) and a core network (CN).

The RNS includes at least one base station (Node-B) 110 and radio network controller (RNC) 120. The Node-B 110 and RNC 120 are connected each other through an Iub interface, and the RNC 120 allocates radio resources to the Node-Bs. The Node-Bs allocate the radio resources to the mobile terminals 100.

The CN includes a serving GPRS support node (SGSN) 130, a gateway GPRS support node (GGSN) 140, and a home location register (HLR) 150. The SGSN 130 connects to the GGSN 140 through a Gn interface and to the HLR 150 though a Gr interface. The GGSN 140 and the HLR 150 are connected each other through a Gc interface. The SGSN 130 acts as a packet switch between the RNS and the CN. The GGSN 140 acts as a gateway to public data networks (PDNs). The HLR 150 is responsible for storing subscriber information and keeping track of the mobile terminals 100.

The CN further includes an authentication, authorization, accounting (AAA) server 160, a dynamic host configuration protocol (DHCP) server 170, and a home agent (HA) server 180. The AAA server 160 is responsible for authenticating subscribers, authorizing access to services, and returning authorization information to the mobile terminal 100. The DHCP server 170 is responsible for Internet protocol (IP) management. The HA server 180 provides mobile IP service for guaranteeing mobility of the mobile terminal 100.

Figure 2:
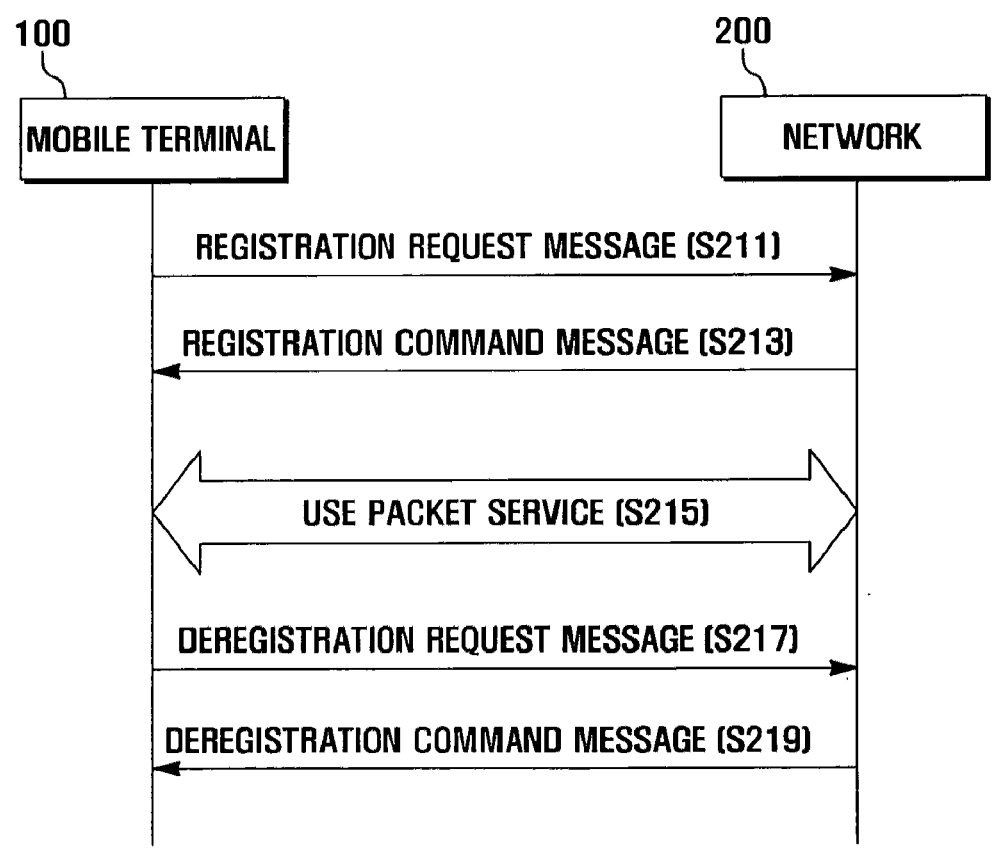
FIG. 2 is a message flow diagram illustrating a registration procedure of a packet service acquisition method according to an exemplary embodiment of the present invention.

FIG. 2 is a message flow diagram illustrating a registration procedure of a packet service acquisition method according to an exemplary embodiment of the present invention.

A mobile terminal 100 connects to a target network 200 for acquiring a packet service. Referring to FIG. 2, a mobile terminal 100 first sends a registration request message to the network 200 (S211). In response to the registration request message, the mobile terminal 100 receives a registration command message from the network 200 (S213). After registration with the network 200, the mobile terminal 100 can use the packet service provided by the network 200 (S215). The mobile terminal 100 sends a deregistration request message to the network 200 (S217). In response to the deregistration request message, the mobile terminal 100 receives a deregistration command message from the network (S219). At this time, the mobile terminal 100 can register itself with the network 200 using a preset registration mode. In this embodiment, two registration modes are proposed: automatic registration mode and manual registration mode.

In the case of the automatic registration mode, the mobile terminal 100 is automatically registered with the network when the mobile terminal 100 powers on. That is, the mobile terminal 100 performs the steps S211 and S213 without user request. Upon registration with the network 200, the mobile terminal 100 can acquire the packet service regardless of the number of times at step S215. The registration is released at steps S217 and S219 when the mobile terminal 100 is turned off.

In the case of the manual registration mode, the mobile terminal 100 initiates the registration procedure in response to a user request. That is, the mobile terminal 100 performs steps S211 and S213 when a packet service request is input after the mobile terminal 100 is turned on. Upon registration with the network 200, the mobile terminal 100 can acquire the packet service regardless of the number of times at step S215. The registration is released at steps S217 and S219 when the mobile terminal 100 is turned off.

Figure 3:
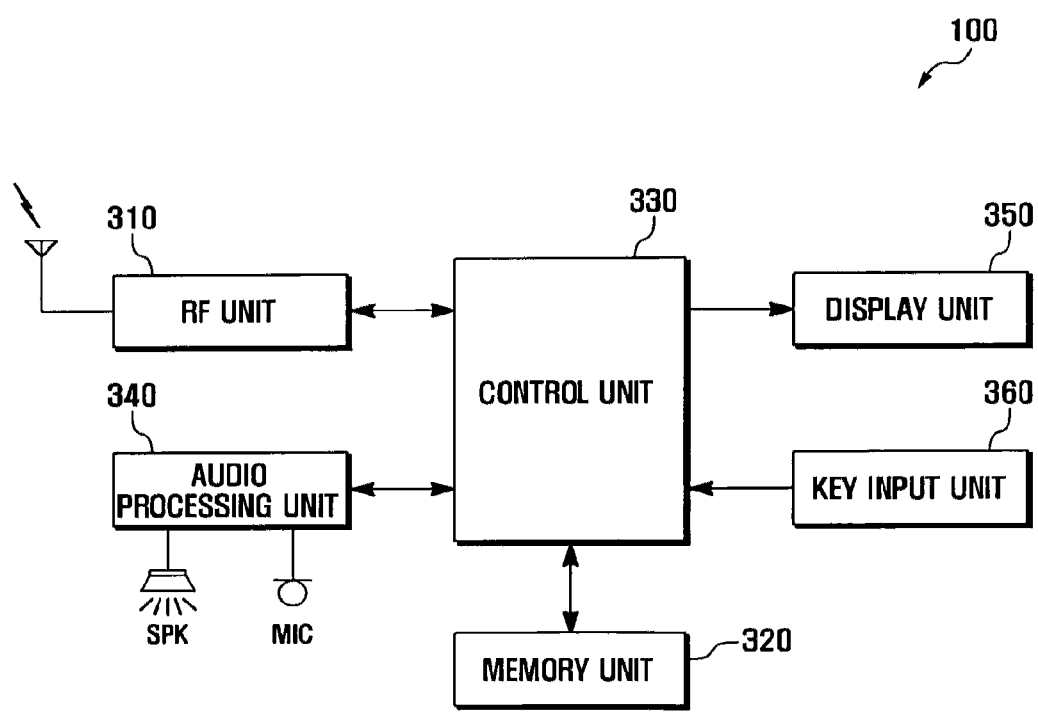
FIG. 3 is a block diagram illustrating a configuration of a mobile terminal according to an exemplary embodiment of the present invention.

FIG. 3 is a block diagram illustrating a configuration of a mobile terminal according to an exemplary embodiment of the present invention. In this embodiment, it is assumed that the mobile terminal is a mobile phone.

Referring to FIG. 3, the mobile terminal 100 includes a radio frequency (RF) unit 310, a memory unit 320, a control unit 330, an audio processing unit 340, a display unit 350, and a key input unit 360.

The RF unit 310 is responsible for radio communication of the mobile terminal 100. The RF unit 310 includes an RF transmitter for up-converting and amplifying the transmission signal and an RF receiver for low noise amplifying and down-converting the received signal. The RF unit 310 exchanges radio signals associated with the registration of the mobile terminal 100 with a network 200. Particularly in this embodiment, the RF unit 310 also exchanges radio signals associated with initiation of the packet service with the network 200.

The memory unit 320 includes at least one program memory and data memory. The program memory stores application programs for executing general operations of the mobile terminal 100. Particularly, in this embodiment, the program memory stores the application programs associated with the packet service acquisition method of the present invention. The data memory stores application data generated while executing the application programs. Particularly in this embodiment, the memory unit 320 stores reference packet service usage frequencies to be compared with the packet service usage frequency.

The control unit 330 controls the general operations of the mobile terminal 100. The control unit 330 includes a data processing module having a transmitter for encoding and modulating the transmission signal and a receiver for demodulating and decoding the received signal. The data processing module may include a modem and a codec. The codec is provided with a data codec for processing packet data and an audio codec for processing audio signal including voice.

When the mobile terminal 100 powers on, the control unit 330 determines whether to register with the network 200. The control unit 330 updates the packet service usage frequency stored in the memory unit 320. The control unit 330 configures a network registration mode of the mobile terminal 100 on the basis of the packet service usage frequency and stores the network registration mode within the memory unit 320.

The network registration mode can be any of the automatic and manual registration modes. That is, the control unit 330 compares the packet service usage frequency in the frequency calculation period with the reference packet service usage frequency and, if the current packet service usage frequency is greater than the reference packet service usage frequency, selects the automatic registration mode. On the other hand, if the current packet service usage frequency is equal to or greater than the reference packet service usage frequency, the control unit 330 selects the manual registration mode.

That is, the control unit 330 checks a preset registration mode when the mobile terminal powers on and determines whether to register with the network. Here, the control unit 330 determines registration when the preset registration mode is an automatic registration mode and waits an additional command when the preset registration mode is a manual registration mode.

The audio processing unit 340 processes the audio data output from the audio codec of the data processing unit and outputs the audio data through a speaker (SPK) in the form of an audible sound, and processes an audio signal input through the microphone (MIC) and outputs the audio signal to the audio codec of the data processing unit in the form of audio data.

The display unit 350 displays the user data output by the control unit 330. The display unit 350 may be implemented with a liquid crystal display (LCD). In this case, the display unit 350 is provided with an LCD controller, a video memory for storing video data, and LCD devices. In a case that the LCD is equipped with touchscreen function, it can operate as a part of the input means.

The key input unit 360 is provided with a plurality of alphanumeric keys for inputting alphanumeric data and function keys for executing various functions of the mobile terminal 100.

Figure 4:
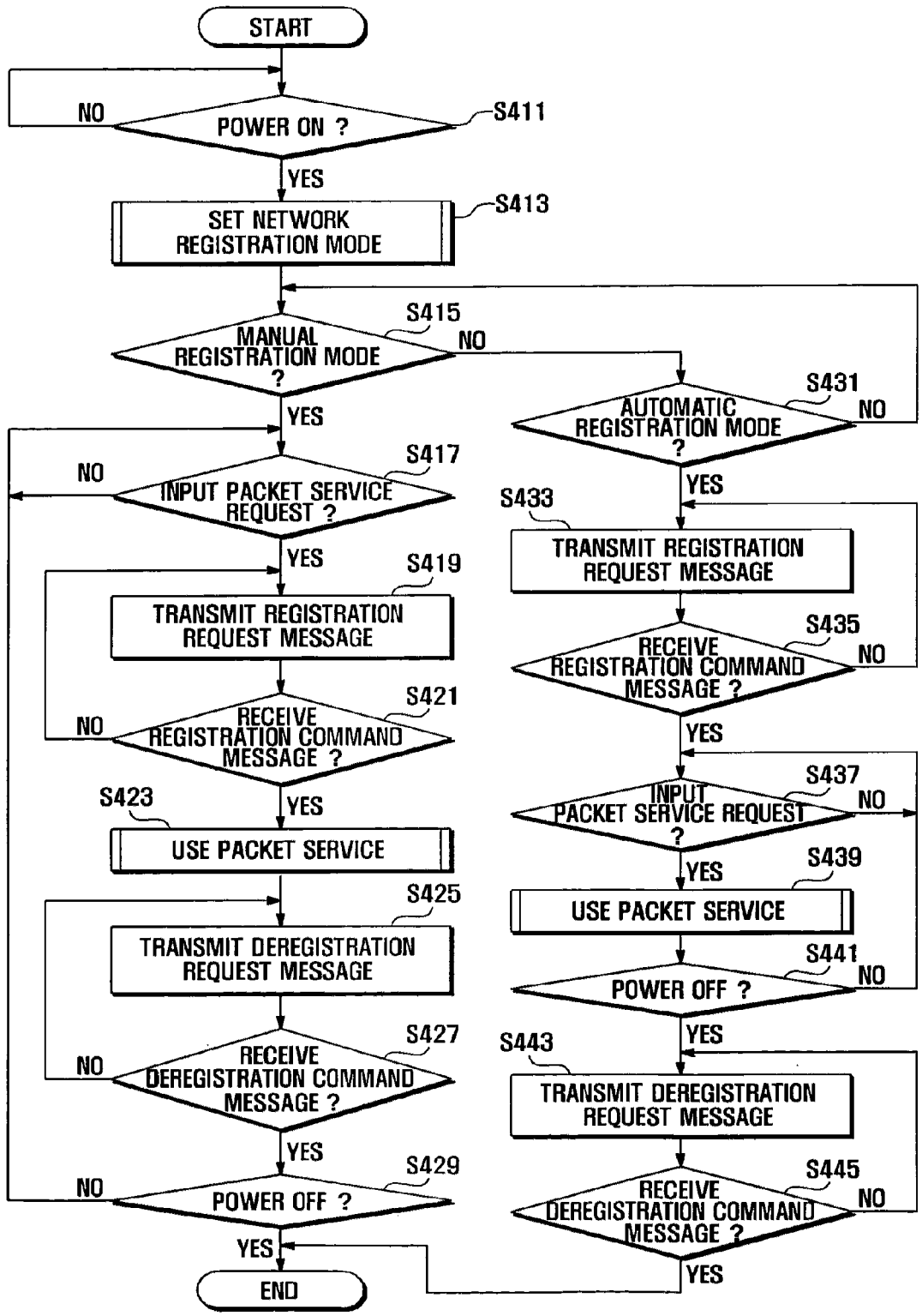
FIG. 4 is a flowchart illustrating a packet service acquisition method according to an exemplary embodiment of the present invention.

FIG. 4 is a flowchart illustrating a packet service acquisition method according to an exemplary embodiment of the present invention.

Referring to FIG. 4, if a power-on of the mobile terminal 100 is detected (S411), the control unit 330 enters a network registration mode configuration procedure (S413). At this time, the control unit 330 configures the network registration mode on the basis of the packet service usage frequency stored in the memory unit 320. The network registration mode can be any of the automatic and manual registration modes. The network registration mode configuration procedure is described in more detail with reference to FIG. 5.

Figure 5:
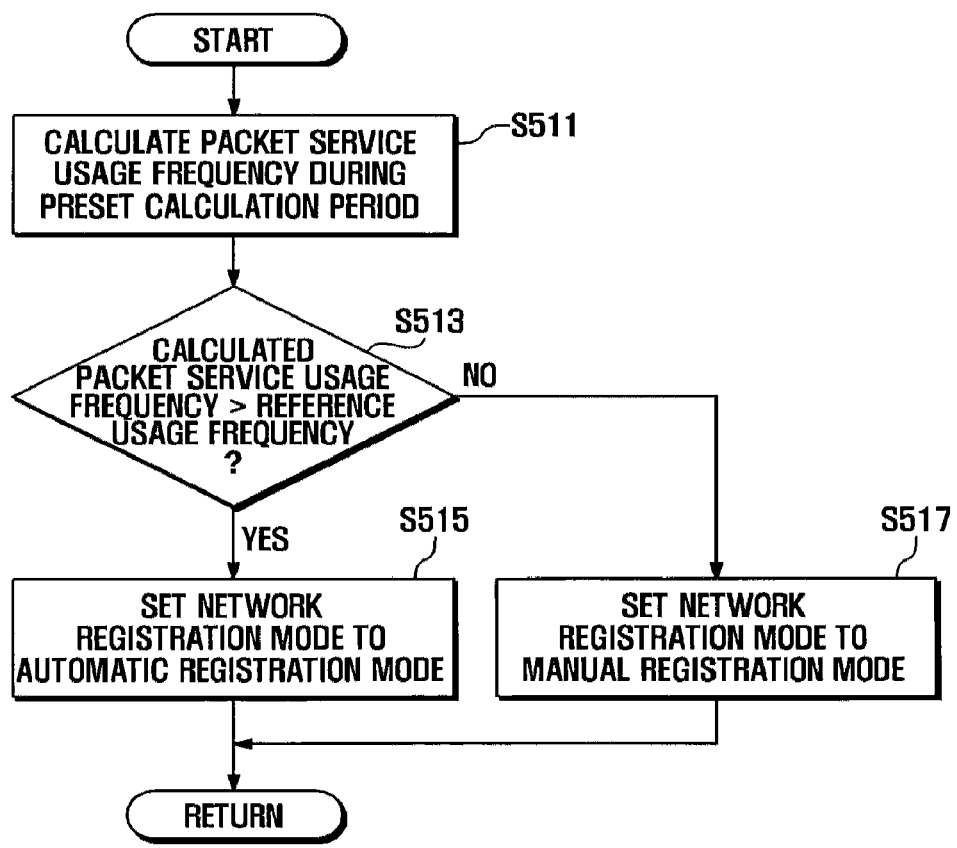
FIG. 5 is a flowchart illustrating the network registration mode configuration procedure of FIG. 4.

FIG. 5 is a flowchart illustrating the network registration mode configuration procedure of FIG. 4.

Referring to FIG. 5, upon entering the network registration mode configuration procedure, the control unit 330 calculates the packet service usage frequency in the preset frequency calculation period (S511). The control unit 330 may calculate the packet service usage frequency of the frequency calculation period starting at a time defined by counting down from the current time. After calculating the current packet service usage frequency, the control unit 330 determines whether the current packet service usage frequency is greater than a reference packet service usage frequency (S513). If the current packet service usage frequency is greater than the reference packet service usage frequency, the control unit 330 sets the network registration mode of the mobile terminal 100 as the automatic registration mode (S515) and, otherwise, sets the network registration mode of the mobile terminal 100 as the manual registration mode (S517).

Returning to FIG. 4, after configuring the network registration mode, the control unit 330 determines whether the current network registration mode is the manual registration mode (S415). If the current network registration mode is the manual registration mode, the control unit 330 waits for an input of a packet service request (S417). If a packet service request is detected, the control unit 330 instructs the mobile terminal 100 to transmit a packet service request message to the network (S419). The packet service request message can be retransmitted periodically until a packet service response message is received. If a packet service response message is received from the network 200 (S421), the control unit 330 performs a packet service acquisition procedure (S423). At this time, the control unit 330 updates the packet service usage frequency by reflecting the current packet service acquisition. The packet service acquisition procedure is described in more detail with reference to FIG. 6.

Figure 6:
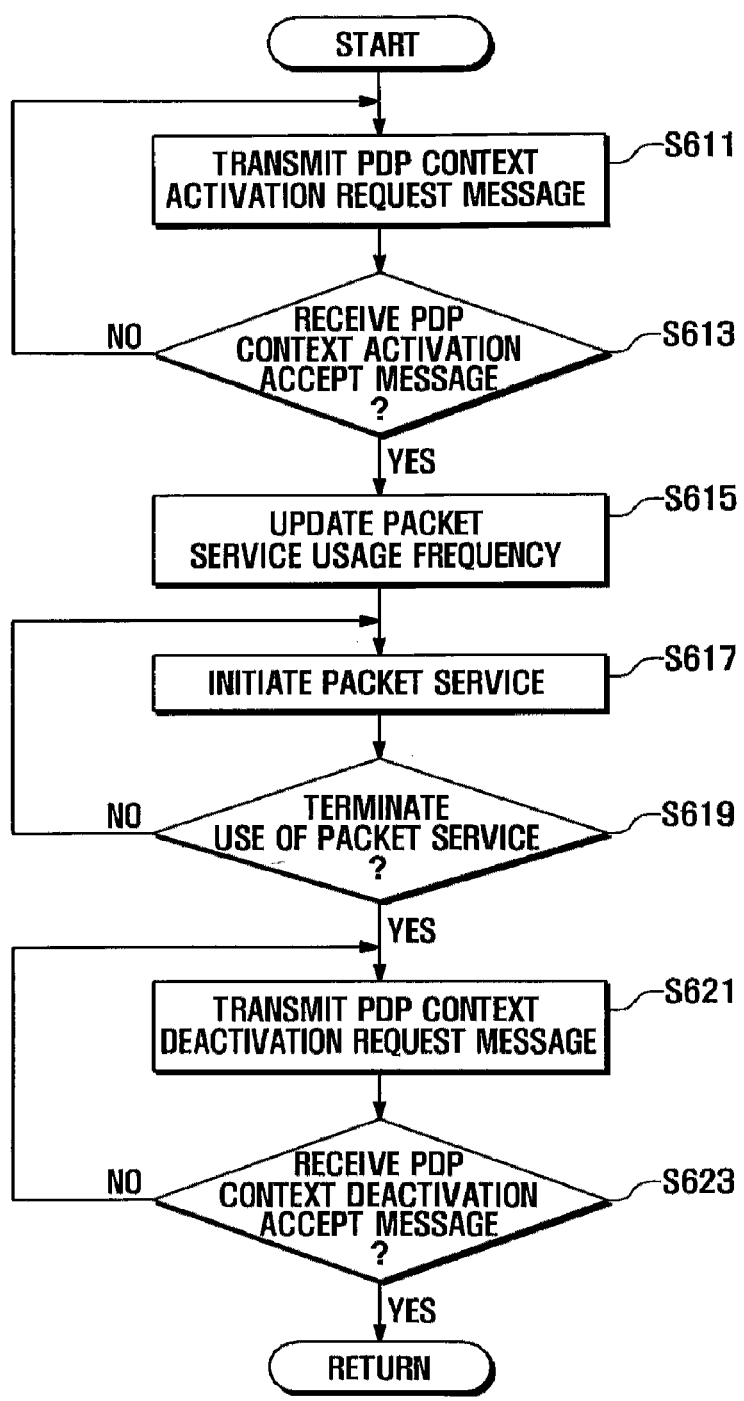
FIG. 6 is a flowchart illustrating the packet service acquisition procedure of FIG. 4.

FIG. 6 is a flowchart illustrating the packet service acquisition procedure of FIG. 4.

Referring to FIG. 6, upon entering the packet service acquisition procedure, the control unit 330 transmits a packet data protocol (PDP) context activation request (ACTIVATE_PDP_CONTEXT_REQUEST) message to the network 200 (S611). The PDP context activation request message can be retransmitted periodically until a PDP context activation accept (ACTIVATE_PDP_CONTEXT_ACCEPT) message is received. If a PDP context activation accept message is received from the network 200 in response to the PDP context activation request message (S613), the control unit 330 updates the packet service usage frequency (S615). That is, the control unit 330 updates the packet service usage frequency by 1 in response to the receipt of the PDP context activation accept message.

After updating the packet service usage frequency, the control unit 330 instructs the mobile terminal 100 to operate in a packet service mode with the network 200 (S617). The packet service includes a contents download service. The packet service can be used continuously and repeatedly regardless of usage times until a packet service termination request is detected.

During the packet service mode, the control unit 330 determines whether a packet service termination request is input (S619). If a packet service termination request is detected, the control unit 330 transmits a PDP context deactivation request (DEACTIVATE_PDP_CONTEXT_REQUEST) message to the network 200 (S621). Here, the packet service termination request may be a power-off request or a deregistration request input while maintaining the power-on state. The PDP context deactivation request message can be retransmitted periodically until a PDP context deactivation accept (DEACTIVATE_PDP_CONTEXT_ACCEPT) message is received.

If a PDP context deactivation accept message is received (S623), the control unit 330 ends the packet service mode.

Returning to FIG. 4, after ending the packet service mode, the control unit 330 transmits a deregistration request message to the network (S425). The deregistration request message can be retransmitted periodically until a deregistration command message is received from the network. If a deregistration command message is received from the network 200 (S427), the control unit 330 determines whether to power off the mobile terminal 100 (S429). If it is determined that powering-off is not required, the control unit 330 repeats steps S417 to S429. On the other hand, if it is determined that powering-off is required, the control unit 330 terminates the packet service acquisition procedure and powers off the mobile terminal 100.

If the current network registration mode is not the manual registration mode at step S415, the control unit 330 determines whether the current network registration mode is the automatic registration mode (S431). If it is determined that the current network registration mode is the automatic registration mode, the control unit 330 instructs the mobile terminal 100 to transmit a packet service request message to the network (S433). The packet service request message can be retransmitted periodically until a packet service response message is received. If a packet service response message is received from the network 200 (S435), the control unit 330 determines whether a packet service request is input (S437). If a packet service request is input, the control unit 330 performs a packet service acquisition procedure (S439). At this time, the control unit 330 updates the packet service usage frequency by reflecting the current packet service acquisition.

The packet service acquisition procedure at step S439 is performed similarly with the packet service acquisition procedure at step S423, except that the packet service termination request is a power-off request or a PDP context release request input while maintaining the registration state.

Next, the control unit 330 determines whether to power off the mobile terminal 100 (S441). If it is determined that powering-off is not required, the control unit 330 repeats steps S437 to S441. On the other hand, if it is determined that powering-off is required, the control unit 330 transmits a deregistration request message to the network 200 (S443). The deregistration request message can be retransmitted periodically until a deregistration command message is received from the network 200.

If a deregistration command message is received (S445), the control unit 330 terminates the packet service mode and powers off the mobile terminal 100.

Although the network registration mode of the mobile terminal is set as the automatic registration mode when the current packet service usage frequency is greater than the reference packet service usage frequency and, otherwise, as the manual registration mode in this embodiment, the present invention is not limited thereto. For example, the mobile terminal can be configured such that, when the currently calculated packet service usage frequency is equal to the reference packet service usage frequency, the previously set network registration mode can be maintained.

That is, if the previous network registration mode of the mobile terminal is the automatic registration mode and the currently calculated packet service usage frequency is equal to the reference packet service usage frequency, the mobile terminal maintains the automatic registration mode. Similarly, if the previous network registration mode of the mobile terminal is the manual registration mode and the currently calculated packet service usage frequency is equal to the reference packet service, the mobile terminal maintains the manual registration mode.

Although the mobile terminal is configured to update the packet service usage frequency when the PDP context activation accept message is received from the network in response to the context activation request message, the present invention is not limited thereto. For example, the mobile terminal can be configured to update the packet service usage frequency when the PDP context deactivation accept message is received from the network in response to the PDP context deactivation request message. Also, the mobile terminal can be configured to update the packet service usage frequency when the registration command message is received from the network in response to the registration request message while the mobile terminal operates with the manual registration mode. Similarly, the mobile terminal can be configured to update the packet service usage frequency when the deregistration command message is received from the network in response to the deregistration request message while the mobile terminal operates with the manual registration mode.

That is, in the case that the mobile terminal operates in the automatic registration mode, the mobile terminal counts at least one of the PDP context activation event and PDP context deactivation event for updating the packet service usage frequency. Also, in the case that the mobile terminal operates in the manual registration mode, it counts at least one of the registration event, PDP context activation event, PDP context deactivation event, and deregistration event for updating the packet service usage frequency.

Although the packet service acquisition method is implemented such that the registration is released after the packet service session is completed when the network registration mode is set to the manual registration mode, and the mobile terminal determines whether to power off after the packet service session is completed when the network registration mode is set to the automatic registration mode, the present invention is not limited thereto. For example, the packet service termination request can be at least one of the power-off request, deregistration request while maintaining the power-on state, and PDP context deactivation request while maintaining the registration state.

That is, the mobile terminal can determines whether to release the registration after the packet service session is completed. If the deregistration is determined, the mobile terminal may determine whether to power off after the release of the registration. If the deregistration is not required, the mobile terminal performs the packet service session again in response to a packet service request. In this case, the registration is not released, and the mobile terminal is not required to register with the network again.

Although the mobile terminal is configured to determine the registration mode upon detecting its power-on in the above exemplary embodiment, the present invention is not limited thereto. For example, the mobile terminal can be configured to check, upon detecting its power-on, the preset registration mode and performs the packet service acquisition procedure according to the registration mode. Also, the mobile terminal can be configured to determine, in the packet service mode, the registration mode while updating the packet service usage frequency.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the mobile terminal and method for acquiring packet services according to the present invention enables registering with a target network in one of different registration modes which is selected on the basis of a packet service usage frequency, whereby the mobile terminal registers itself with the network according to a user request when the packet service usage frequency is relatively small. Since the mobile terminal is registered to the network only when the packet service is required, it is possible to reducing waste of resources. In a case of frequent use of the packet service, the mobile terminal is configured to automatically register with the network, resulting in fast packet service acquisition. The packet service acquisition method of the present invention helps reducing a number of mobile terminals registered with a network, whereby the network can reduce its processing load, resulting in improvement of network throughput.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A packet service acquisition method for a mobile terminal, comprising:
   determining, when the mobile terminal powers on, whether to register with a network based on a preset network registration mode;
   updating, when activating a packet service, a packet service usage frequency according to at least one of a packet data protocol (PDP) context activation frequency and a PDP context deactivation frequency, wherein the packet service usage frequency is a number of times the mobile terminal uses the packet service during a frequency calculation period; and
   setting one of distinctive network registration modes using the packet service usage frequency.

2. The packet service acquisition method of claim 1, wherein the network registration modes comprise an automatic registration mode and a manual registration mode, and setting one of the distinctive network registration modes comprises setting, when the packet service usage frequency is greater than a reference usage frequency, the automatic registration mode and, otherwise, the manual registration mode.

3. The packet service acquisition method of claim 2, wherein updating a packet service usage frequency comprises updating, when the automatic registration mode is set, the packet service usage frequency according to at least one of the packet data protocol (PDP) context activation frequency and the PDP context deactivation frequency.

4. The packet service acquisition method of claim 2, wherein updating a packet service usage frequency comprises updating, when the manual registration mode is set, the packet service usage frequency according to at least one of the packet data protocol (PDP) context activation frequency, the PDP context deactivation frequency, and a network registration release frequency.

5. A packet service acquisition method for a mobile terminal, comprising:
   setting, when the mobile terminal powers on, a network registration mode of the mobile terminal based on a packet service usage frequency, wherein the packet service usage frequency is a number of times the mobile terminal uses the packet service during a frequency calculation period; and
   updating, when the packet service is used after registration with the network, the packet service usage frequency according to at least one of a packet data protocol (PDP) context activation frequency and a PDP context deactivation frequency.

6. The packet service acquisition method of claim 5, wherein the network registration mode is one of an automatic registration mode and a manual registration mode, and setting a network registration mode comprises selecting, when the packet service usage frequency is greater than a reference usage frequency, the automatic registration mode and, otherwise, the manual registration mode.

7. The packet service acquisition method of claim 6, wherein updating the packet service usage frequency comprises updating, when the automatic registration mode is set, the packet service usage frequency according to at least one of the packet data protocol (PDP) context activation frequency and the PDP context deactivation frequency.

8. The packet service acquisition method of claim 6, wherein updating a packet service usage frequency comprises updating, when the manual registration mode is set, the packet service usage frequency according to at least one of the packet data protocol (PDP) context activation frequency, the PDP context deactivation frequency, and a network registration release frequency.

9. A mobile terminal configured to acquire a packet service from a network, the mobile terminal comprising:
   a memory configured to store a packet service usage frequency, wherein the packet service usage frequency is a number of times the mobile terminal uses the packet service during a frequency calculation period;
   a control unit configured to determine, when the mobile terminal powers on, whether to register with the network based on the packet service usage frequency and update the packet service usage frequency according to at least one of a frequency of the PDP context activation and a frequency of the PDP context deactivation whenever the mobile terminal acquires the packet service from the network; and
   a radio frequency unit configured to register the mobile terminal with the network under control of the control unit.

10. The mobile terminal of clam 9, wherein the memory is further configured to store a reference packet service usage frequency, and wherein the control unit is further configured to select, when the packet service usage frequency is greater than the reference packet service usage frequency, an automatic registration mode and, otherwise, a manual registration mode.

11. The mobile terminal of claim 10, wherein the control unit is further configured to register, when the automatic registration mode is set when the mobile terminal powers on, with the network, and wait for a command when the manual registration mode is set.

12. The mobile terminal of claim 11, wherein the control unit is further configured to:
   register, when registration with the network is determined, with the network;
   perform a packet data protocol (PDP) context activation with the network in response to a packet service request input;
   acquire a packet service from the network; and
   update the packet service usage frequency according to at least one of the frequency of the PDP context activation and the frequency of the PDP context deactivation.

13. The mobile terminal of claim 11, wherein the control unit is further configured to:
   wait for a command, when registration with the network is not determined;
   perform a packet data protocol (PDP) context activation with the network in response to a packet service request input;
   acquire a packet service from the network;
   perform a PDP context deactivation with the network in response to a packet service termination request input; and
   update the packet service usage frequency according to at least one of a frequency of the registration with the network, the PDP context activation frequency, the PDP context deactivation frequency, and a network registration release frequency.

14. A packet service acquisition method for a mobile terminal, comprising:
   entering, by the mobile terminal, a network registration mode configuration procedure;

calculating, by the mobile terminal, a packet service usage frequency corresponding to a packet service;

determining, by the mobile terminal, whether the current packet service usage frequency is greater than a reference packet service usage frequency;

if the current packet service usage frequency is greater than the reference packet service usage frequency, setting, by the mobile terminal, a network registration mode of the mobile terminal to an automatic registration mode and, otherwise, setting, by the mobile terminal, the network registration mode of the mobile terminal to a manual registration mode; and updating the packet service usage frequency when activating the packet service according to at least one of a packet data protocol (PDP) context activation frequency and a PDP context deactivation frequency.

15. The packet service acquisition method of claim 14, wherein updating the packet service usage frequency comprises updating, when the automatic registration mode is set, the packet service usage frequency according to at least one of the packet data protocol (PDP) context activation frequency and the PDP context deactivation frequency.

16. The packet service acquisition method of claim 14, wherein updating the packet service usage frequency comprises updating, when the manual registration mode is set, the packet service usage frequency according to at least one of the packet data protocol (PDP) context activation frequency, the PDP context deactivation frequency, and a network registration release frequency.

17. The packet service acquisition method of claim 14 further comprising:

when the automatic registration mode is set when the mobile terminal powers on, registering with the network, and waiting for a command when the manual registration mode is set.

18. The packet service acquisition method of claim 1, wherein setting one of the distinctive network registration modes comprises:

setting, when the packet service usage frequency is greater than a reference usage frequency, an automatic registration mode.

19. The packet service acquisition method of claim 1, wherein setting one of the distinctive network registration modes comprises:

setting, when the packet service usage frequency is not greater than a reference usage frequency, a manual registration mode.

* * * * *

UNITED STATES PATENT AND TRADEMARK OFFICE
CERTIFICATE OF CORRECTION

| | | |
|---|---|---|
| PATENT NO. | : 8,374,184 B2 | Page 1 of 1 |
| APPLICATION NO. | : 12/220883 | |
| DATED | : February 12, 2013 | |
| INVENTOR(S) | : Hwang | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 912 days.

Signed and Sealed this
Eleventh Day of November, 2014

Michelle K. Lee
*Deputy Director of the United States Patent and Trademark Office*